(12) United States Patent
Baerthlein et al.

(10) Patent No.: US 9,600,004 B2
(45) Date of Patent: Mar. 21, 2017

(54) SYSTEM AND METHOD FOR REGULATION OF VOLTAGE ON AN ELECTRICAL NETWORK

(71) Applicant: GENERAL ELECTRIC COMPANY, Schenectady, NY (US)

(72) Inventors: Eva-Maria Baerthlein, Hamburg (DE); Marianne Luise Susanne Hartung, Munich (DE); Ara Panosyan, Munich (DE)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 14/617,065

(22) Filed: Feb. 9, 2015

(65) Prior Publication Data
US 2016/0231756 A1    Aug. 11, 2016

(51) Int. Cl.
*G05F 1/14* (2006.01)
*G05F 1/147* (2006.01)
(Continued)

(52) U.S. Cl.
CPC ............... *G05F 1/147* (2013.01); *G05F 1/14* (2013.01); *G05F 1/153* (2013.01); *G05F 1/16* (2013.01);
(Continued)

(58) Field of Classification Search
CPC . G05F 1/14; G05F 1/147; G05F 1/153; G05F 1/16; G05F 1/20
See application file for complete search history.

(56) References Cited

U.S. PATENT DOCUMENTS 5,055,766 A * 10/1991 McDermott ............ G05F 1/153
                                                        323/255
5,117,175 A    5/1992 Pettigrew et al.
(Continued)

FOREIGN PATENT DOCUMENTS

EP    0923181 A1    6/1999
EP    1923765 A1    5/2008
(Continued)

OTHER PUBLICATIONS

S. A. El-Kashlan et al., "Power Quality Assessment via Coordinated Voltage control in Distributed Power Generation," International Journal of Electrical and Power Engineering, vol. 3, No. 6, 2009, pp. 289-295.

(Continued)

*Primary Examiner* — Timothy J Dole
*Assistant Examiner* — Ishrat Jamali
(74) *Attorney, Agent, or Firm* — Nitin N. Joshi

(57) ABSTRACT

An electric power system including an on-load tap changing (OLTC) transformer is provided. The OLTC transformer includes a primary winding and a secondary winding. A portion of the at least one primary winding and at least one of the secondary windings are inductively coupled to each other. Further, the electric power system includes at least one on-load tap changer coupled to the at least one primary winding or the at least one secondary winding of the OLTC transformer. The on-load tap changer is configured to regulate the portion of the at least one primary winding or the at least one secondary winding that are inductively coupled to each other. Furthermore, the system includes at least one controller coupled to the on-load tap changer. The controller is configured to determine a permissible voltage range defined by a bandwidth around a voltage set-point at the at (Continued)

least one on-load tap changer, where the bandwidth is a function of one or more electrical network states.

12 Claims, 6 Drawing Sheets

(51) Int. Cl.
| | |
|---|---|
| *G05F 1/153* | (2006.01) |
| *G05F 1/16* | (2006.01) |
| *H01F 29/04* | (2006.01) |
| *H02P 13/06* | (2006.01) |
| *H02J 3/12* | (2006.01) |
| *H02J 3/38* | (2006.01) |
| *H02J 13/00* | (2006.01) |

(52) U.S. Cl.
CPC .............. *H01F 29/04* (2013.01); *H02P 13/06* (2013.01); *H02J 3/12* (2013.01); *H02J 3/381* (2013.01); *H02J 3/382* (2013.01); *H02J 13/0006* (2013.01)

(56) References Cited

U.S. PATENT DOCUMENTS

| | | | |
|---|---|---|---|
| 5,552,696 | A | 9/1996 | Trainor et al. |
| 5,581,173 | A * | 12/1996 | Yalla .................. G05F 1/147 307/31 |
| 7,852,650 | B2 * | 12/2010 | Taylor ................. H02J 3/1878 323/340 |
| 7,859,232 | B2 | 12/2010 | Berggren et al. |
| 8,437,883 | B2 | 5/2013 | Powell et al. |
| 8,558,519 | B2 * | 10/2013 | Bryant ..................... G05F 1/14 323/255 |
| 8,738,191 | B2 | 5/2014 | Aivaliotis et al. |
| 2013/0307494 | A1 | 11/2013 | Meinecke |
| 2015/0233975 | A1 | 8/2015 | Itaya |
| 2015/0261232 | A1 * | 9/2015 | Hinz ........................ H02J 3/12 323/341 |

FOREIGN PATENT DOCUMENTS

| | | |
|---|---|---|
| JP | 2006254602 A | 9/2006 |
| JP | 5436734 B1 | 3/2014 |
| WO | 2013160044 A1 | 10/2013 |
| WO | 2014080514 A1 | 5/2014 |

OTHER PUBLICATIONS

I. Leisse et al., "Coordinated Voltage Control in Distribution systems with DG-Control Algorithm and Case Study," Cired Workshop-Lisbon, May 29-30, 2012, Paper No. 361, pp. 1-4.

A. Casavola et al., "A command governor approach to the voltage regulation problem in MV/LV networks with renewable generation units," Clean Electrical Power, 2009 International Conference on Jun. 9-11, 2009. pp. 304-309.

Baerthlein et al., "Variable Voltage Set Point Control of Tap Changers in Distribution Grids", IEEE Pes Innovative Smart Grid Technologies, pp. 1-6, Oct. 12, 2014.

Baerthlein et al., "Variable Bandwidth Control of Tap Changers in Distribution Grids", IEEE Innovative Smart Grid Technologies, pp. 1-5, Nov. 3, 2015.

PCT Search Report and Written Opinion issued in connection with corresponding PCT Application No. PCT/US2016/017093 on Apr. 29, 2016.

* cited by examiner

SYSTEM AND METHOD FOR REGULATION OF VOLTAGE ON AN ELECTRICAL NETWORK

BACKGROUND

The field of the disclosure relates generally to electrical networks, and, more particularly, to tap changers in electrical networks and their methods of operation.

Many known electrical networks include electric power transformers configured to regulate voltages through the use of on-load tap changers. An on-load tap changing (OLTC) transformer has several connection points, so called "taps", along at least one of its windings. With each of these tap positions a certain number of turns is selected. Since the output voltage of the OLTC transformer is determined by the turns ratio of the primary windings versus the secondary windings, the output voltage can be varied by selecting different taps. The tap position to connect to is determined by a suitable controller and tap selection is shifted through an OLTC device. Since high voltages are involved, and the taps are changed while the OLTC transformer is under load, each time a tap is changed, arcing occurs. Arcing may lead to deterioration of the associated materials, thereby tending to decrease the service life of the tap changer mechanisms. Therefore, it is typically desirable to shift taps as infrequently as possible.

However, it is not unusual to have multiple tap changes over a 24-hour period, especially with the increasing share of variable and intermittent distributed generation (DG) in electric networks. The operators of electric networks determine the tradeoff between the frequency and number of on-load tap changes with the subsequent wear on the tap changer and the quality of the voltage on the portion of the system maintained by the affected OLTC transformer.

Many known on-load tap changer controllers are configured to move the tap in an OLTC transformer automatically as a function of "raise" and "lower" commands to maintain the system voltage at a predetermined value, i.e., a constant voltage set-point. Typically, on-load tap changer controllers monitor the difference between the measured voltage at the on-load tap changer and the voltage set-point. The voltage step nature of on-load tap changer output requires a dead band or bandwidth around the voltage set-point to ensure stable operation. In prior art, this bandwidth is constant in width for all possible network states. A bandwidth that is defined to cover a smaller area around the voltage set-point keeps the measured voltage close to the set point voltage and thus leads to larger number of tap changes. On the other hand, a wider bandwidth allows the measured voltage to vary within a larger area and thus leads to less tap changes.

Many known electrical networks include a growing share of DG. Many types of DGs significantly increase the variability of the voltage on the portion of the system maintained by the affected OLTC transformer, thereby increasing the frequency of commanded tap changes. Moreover, with a significant portion of DG on one side of the transformer, i.e., typically the lower voltage downstream side, electric power flow through the OLTC transformer may be reversed, i.e., transmitted from the low voltage side to the high voltage side of the transformer. As such, the affected on-load tap changer controller needs to be configured to detect such a power flow reversal and still be able to ensure correct voltage regulation.

In response to the changing requirements of voltage regulation, systems that determine voltage set-points based on current network conditions have been devised. The current network state may be indicated e.g. by current or power flow measurements at the OLTC transformer. Although one measured current or power flow value does not explicitly correspond to one defined network state, i.e. different network states may result in the same measured current or power flow value, it does give an indication to the currently prevailing network state. In such systems, at times of large reverse power or current flow, which results in high network voltages, especially when DG is connected at remote feeder ends, a low voltage set-point is set. In contrast, during times of high demand by the loads and low network voltages, a higher voltage set-point is set. That way, the hosting capacity of the electrical network regarding distributed generation or e-mobility is increased by allowing variance in the voltage set-point based on network state.

In many of these variable set-point concepts, a set-point curve dependent on power flow or current over the tap changer is determined. The set-point curve may be linear in nature for a large portion. It has been observed that the linear nature of the set-point curve and a constant bandwidth around the voltage set-point may lead to frequent tap changes. In these concepts, the bandwidth remains of constant width around the set-point even in network states when a wider bandwidth may be permissible.

Hence, there is a need to define a bandwidth that is adjusted dependent on the current network state in order to ensure a minimum number of tap changes.

BRIEF DESCRIPTION

In one embodiment, an electric power system including an on-load tap changing (OLTC) transformer is provided. The OLTC transformer includes at least one primary winding and at least one secondary winding. A portion of the at least one primary winding and at least one of the secondary windings are inductively coupled to each other. Further, the electric power system includes at least one on-load tap changer coupled to the at least one primary winding or the at least one secondary winding of the OLTC transformer. The on-load tap changer is configured to regulate the portion of the at least one primary winding or the at least one secondary winding that are inductively coupled to each other. Furthermore, the system includes at least one controller coupled to the on-load tap changer. The controller is configured to determine a permissible voltage range defined by a bandwidth around a voltage set-point at the at least one on-load tap changer, wherein the bandwidth is a function of one or more electrical network states.

In another embodiment, a method of regulating a voltage at an on-load tap changer is provided. The on-load tap changer is coupled to at least one OLTC transformer. The OLTC transformer includes at least one primary winding and at least one secondary winding. The on-load tap changer is configured to regulate an inductive coupling between the at least one primary winding and the at least one secondary winding. The on-load tap changer is further communicably coupled to a controller. The method includes determining a bandwidth around a voltage set-point at the tap changer. The bandwidth is a function of at least one characteristic value that reflects the current state of an electrical network. Further, the method includes measuring the voltage at the on-load tap changer in the electrical network. Furthermore, the method also includes generating a command for at least one tap change when the measured voltage at the OLTC transformer falls out of bandwidth defined for the electrical network such that a measured voltage after the at least one tap change is within the bandwidth.

DRAWINGS

These and other features, aspects, and advantages of the present invention will become better understood when the following detailed description is read with reference to the accompanying drawings in which like characters represent like parts throughout the drawings, wherein.

Figure 1:
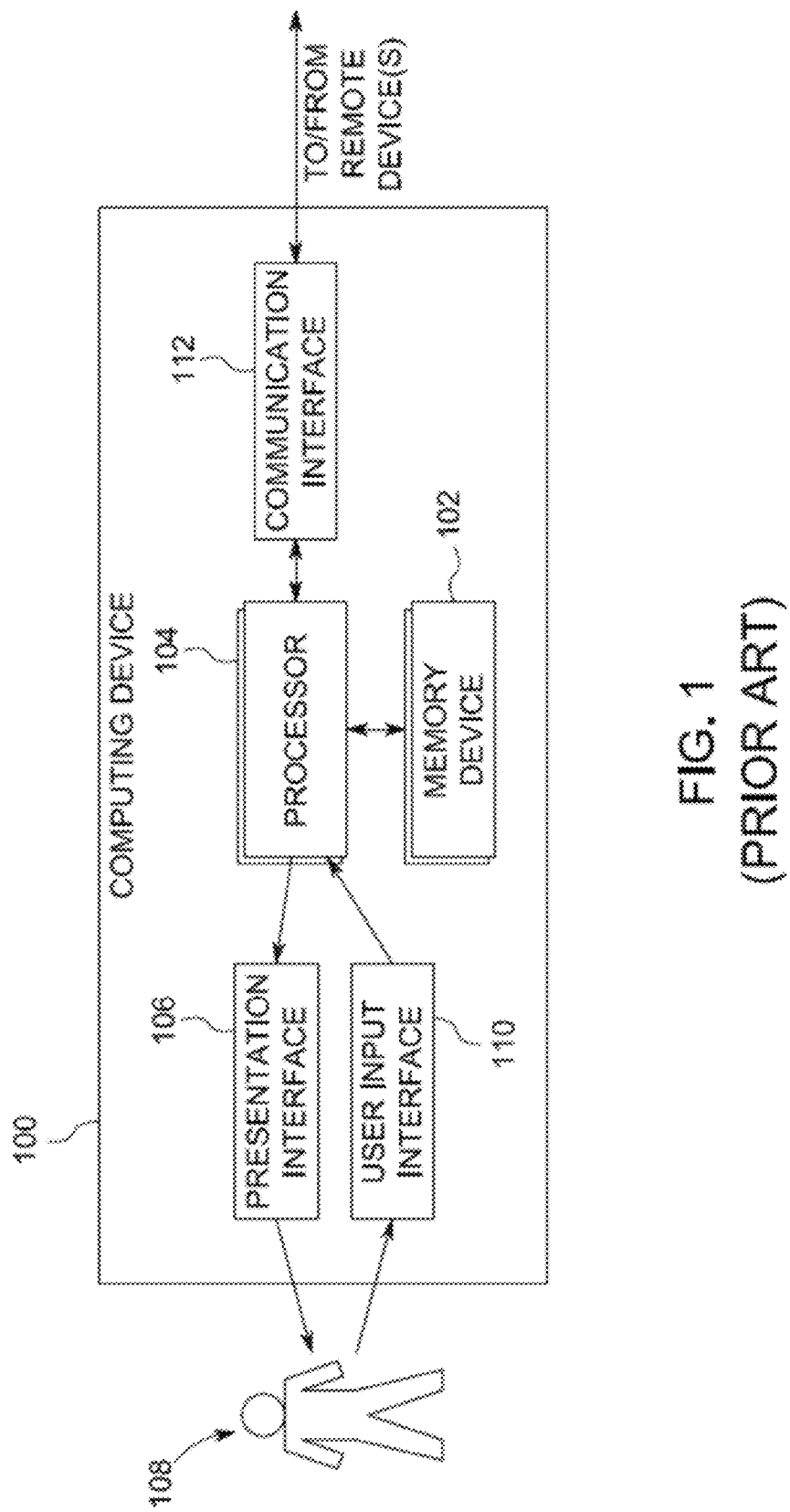
FIG. 1 is a block diagram of an exemplary computing device.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "substantially", and "approximately" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Further, as used herein, the terms "software" and "firmware" are interchangeable, and include any computer program stored in memory for execution by personal computers, workstations, clients and servers.

Furthermore, as used herein, the terms "dead band", "tolerance band", "permissible range", and "bandwidth" are interchangeable, and include any range of numerical values or region specified in a graphical representation, in which no control action is taken.

The control schemes for the tap changers embedded within the on-load tap changing (OLTC) transformers typically used by the electrical networks described herein provide a method for regulating voltage on such distribution systems facilitating a minimum number of tap changes and a maximization of the grid's hosting capacity. Specifically, the embodiments described herein replace known control methods using a bandwidth of constant width around a specified voltage set-point with a bandwidth of a variable range that is specifically determined for a particular electrical network. More specifically, the embodiments described herein include determining a bandwidth of variable range around a voltage set-point at the tap changer, where the bandwidth is a function of current network conditions that may be indicated by power flow or current measurements at the OLTC transformer. Therefore, the embodiments described herein ensure effective voltage regulation while decreasing the number of tap changes, thereby facilitating smooth and stable regulation of voltage variations due to loads or distributed generation (DG) on the feeders downstream of the OLTC transformer. The decreased number of tap changes facilitates extending the service life of the tap changers. Moreover, the variable bandwidth dependent on currently prevailing network conditions maximizes the hosting capacity of the electrical network for DG and electric vehicles.

FIG. 1 is a block diagram of an exemplary computing device 100 that may be used to determine control steps required for an electrical network, more specifically, a tap changer device associated with a distribution transformer (neither shown in FIG. 1). Also, in the exemplary embodiment, computing device 100 monitors and/or controls any piece of equipment, any system, and any process associated with the electrical networks, e.g., without limitation, voltage regulators, at least a portion of DG and monitoring devices (neither shown in FIG. 1). Computing device 100 includes a memory device 102 and a processor 104 operatively coupled to the memory device 102 for executing instructions. In some embodiments, executable instructions are stored in memory device 102. Computing device 100 is configurable to perform one or more operations described herein by programming processor 104. For example, processor 104 may be programmed by encoding an operation as one or more executable instructions and providing the executable instructions in memory device 102. In the exemplary embodiment, memory device 102 is one or more devices that enable storage and retrieval of information such as executable instructions and/or other data. Memory device 102 may include one or more computer readable media.

Memory device 102 may be configured to store operational measurements including, without limitation, real-time and historical transformer (high side and low side) and feeder voltage values, tap changes, power flow, current and/or any other type data. Also, memory device 102 includes, without limitation, sufficient data, algorithms, and commands to facilitate monitoring and control of the components within the associated electrical network.

In some embodiments, computing device 100 includes a presentation interface 106 coupled to processor 104. Presentation interface 106 presents information, such as a user interface and/or an alarm, to a user 108. In some embodiments, presentation interface 106 includes one or more display devices. In some embodiments, presentation interface 106 presents an alarm associated with the associated electrical network being monitored and controlled, such as by using a human machine interface (HMI) (not shown in FIG. 1). Also, in some embodiments, computing device 100 includes a user input interface 110. In the exemplary embodiment, user input interface 110 is coupled to processor 104 and receives input from user 108.

A communication interface 112 is coupled to the computing device 100 and is configured to be coupled in communication with one or more other devices, such as a sensor or another computing device 100, and to perform input and output operations with respect to such devices while performing as an input channel. Communication interface 112 may receive data from and/or transmit data to one or more remote devices. For example, a communication interface 112 of one computing device 100 may transmit an alarm to the communication interface 112 of another computing device 100.

In the exemplary embodiment, control of a tap changer for a transformer (neither shown in FIG. 1) is performed with local control devices, i.e., a localized computing device 100. Alternatively, control of such tap changers is performed as a portion of a larger, more comprehensive system, as discussed further below.

Figure 2:
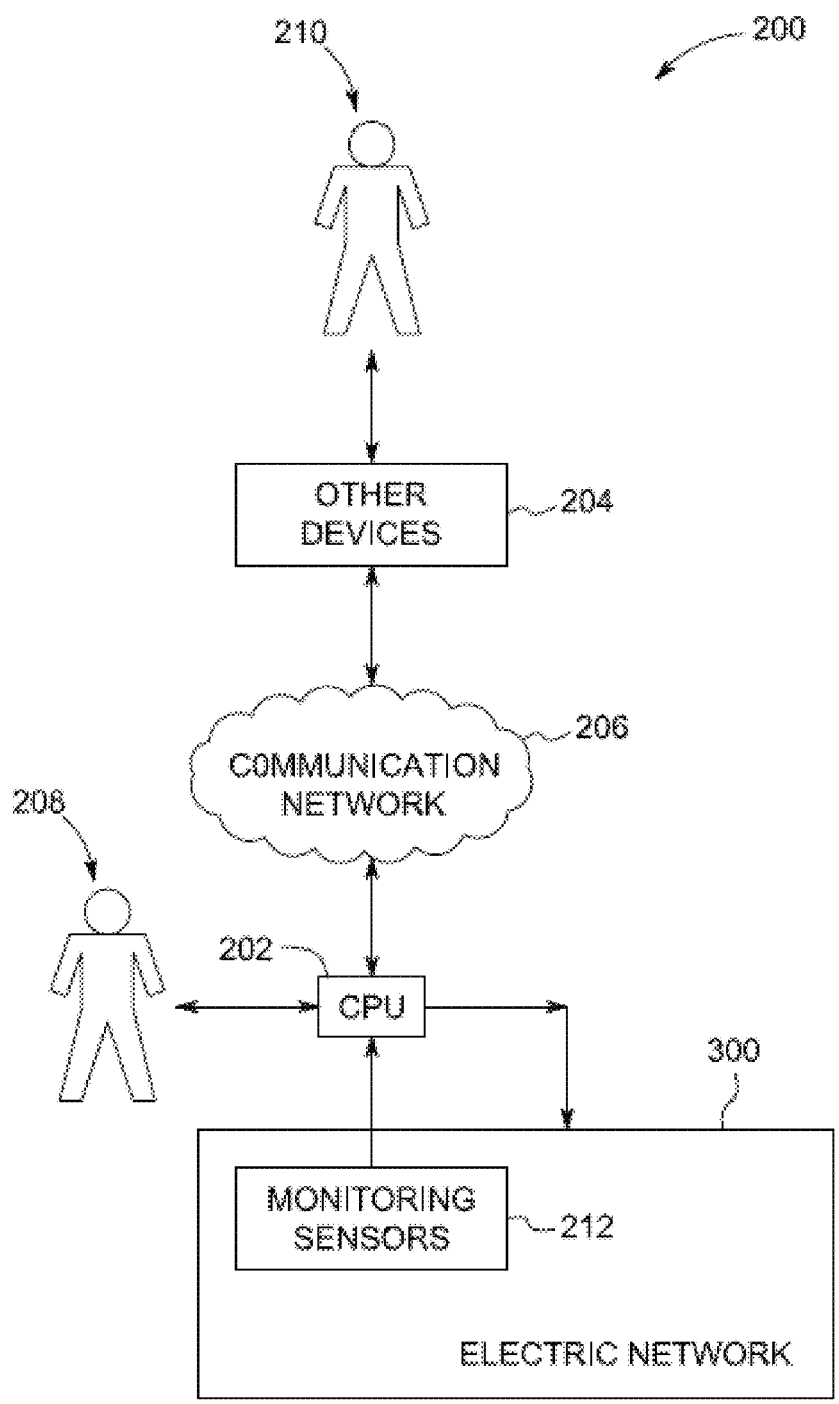
FIG. 2 is a block diagram of a portion of an exemplary monitoring and control system that may include the computing device shown in FIG. 1.

FIG. 2 is a block diagram of a portion of a monitoring and control system, i.e., a Supervisory Control and Data Acquisition (SCADA) system 200 that may be used to monitor and control at least a portion of an electrical network 300. As used herein, the term "SCADA system" refers to any control and monitoring system that may monitor and control electrical network 300 across multiple sites, remote sites, and large distances. SCADA system 200 includes at least one controller 202 that is configured to execute monitoring and control algorithms and monitoring and control logic. The controller 202, in one embodiment, includes a computing device such as the computing device 100. In some embodiments, the controller 202 is communicably coupled to a computing device through a communication network 206. The controller 202 may further be coupled to other devices 204 via the communication network 206.

The controller 202 interacts with a first operator 208, e.g., without limitation, via user input interface 110 and/or presentation interface 106. In one embodiment, controller 202 presents information about electric power distribution system 500, such as alarms, to the first operator 208. Other devices 204 interact with a second operator 210, e.g., without limitation, via user input interface 110 and/or presentation interface 106. For example, other devices 204 present alarms and/or other operational information to second operator 210. As used herein, the term "operator" includes any person in any capacity associated with operating and maintaining the electrical network 300, including, without limitation, shift operations personnel, maintenance technicians, and electric dispatch facility supervisors.

The electrical network 300 (described in more detail with FIG. 3) includes one or more monitoring sensors 212 coupled to the controller 202. Monitoring sensors 212 collect operational measurements including, without limitation, AC voltages, currents and powers generated within and transmitted through the electrical network 300. Monitoring sensors 212 repeatedly, e.g., periodically, continuously, and/or upon request, transmit operational measurement readings at the time of measurement. The controller 202 receives and processes the operational measurement readings. In one embodiment, such data may be transmitted across the communication network 206 and may be accessed by any device capable of accessing the network 206 including, without limitation, desktop computers, laptop computers, and personal digital assistants (PDAs) (neither shown).

While FIG. 2 describes an alternative embodiment, some components described for FIG. 2 may be used with the stand-alone computing device 100 (shown in FIG. 1), e.g., without limitation, monitoring sensors 212. As such, computing device 100 includes, without limitation, sufficient data, algorithms, and commands to independently facilitate voltage control of the electrical network 300 as described herein, thereby making SCADA system 200 and the communications network 206 unnecessary.

Figure 3:
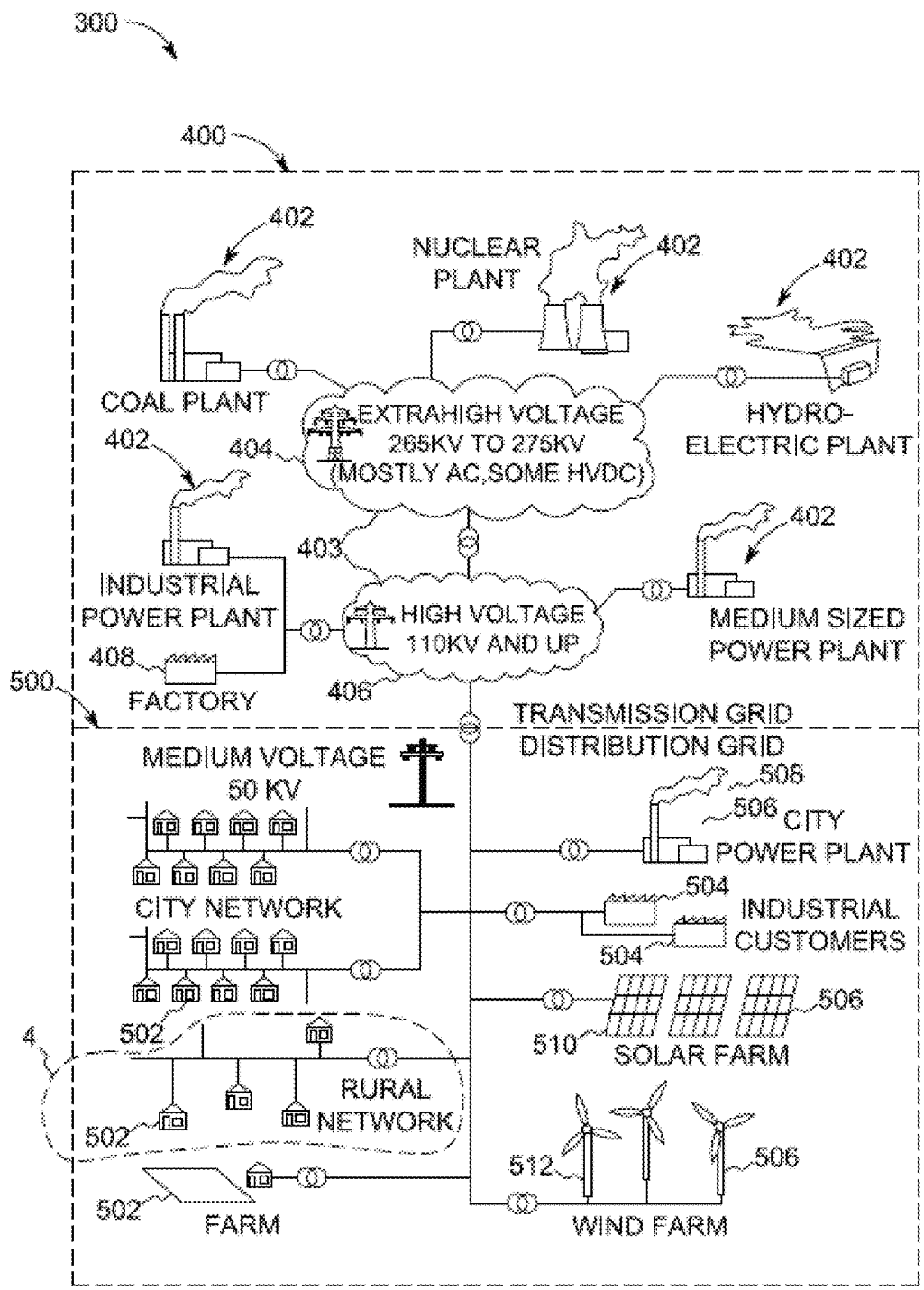
FIG. 3 is a general schematic diagram of an exemplary electrical network including both an exemplary transmission network and an exemplary electric power distribution system with distributed generation (DG)

FIG. 3 is a general schematic diagram of an exemplary electrical network 300. In general, the electrical network 300 typically includes a generation and transmission portion 400 coupled to an exemplary electric power distribution system 500. Generation and transmission portion 400 includes a plurality of power plants 402 generating and transmitting electric power to a transmission grid 403, which includes an extra high voltage transmission grid 404 and a high voltage transmission grid 406 through which power is transmitted to electric power distribution system 500. In the exemplary embodiment, extra high voltage grid 404 includes voltages greater than approximately 265 kiloVolts (kV) and high voltage transmission grid 406 includes voltages between approximately 102 kV and approximately 265 kV. Alternatively, extra high voltage grid 404 and high voltage transmission grid 406 have any voltages that enable operation of electric power distribution system 500 as described herein. Some electric power customers, such as power-intensive industrial facilities, e.g., and without limitation, factory 408, are coupled to high voltage transmission grid 406. Electrical network 300 may include, without limitation, any number, type and configuration of power plants 402, extra high voltage transmission grids 404, high voltage transmission grids 406, factories 408, and electric power distribution systems 500.

Also, in the exemplary embodiment, electric power distribution system 500 includes low wattage consumers 502 and industrial medium wattage consumers 504. Electric power distribution system 500 also includes DG 506. Such DG 506 includes, without limitation, a city power plant 508, a solar farm 510, and a wind farm 512. While electric power distribution system 500 is shown with an exemplary number and type of distributed generators 506, electric power distribution system 500 may include any number and type of distributed generators 506, including, without limitation, individual diesel generators, micro-turbines, solar collector arrays, solar photovoltaic (PV) arrays, and wind turbines.

Figure 4:
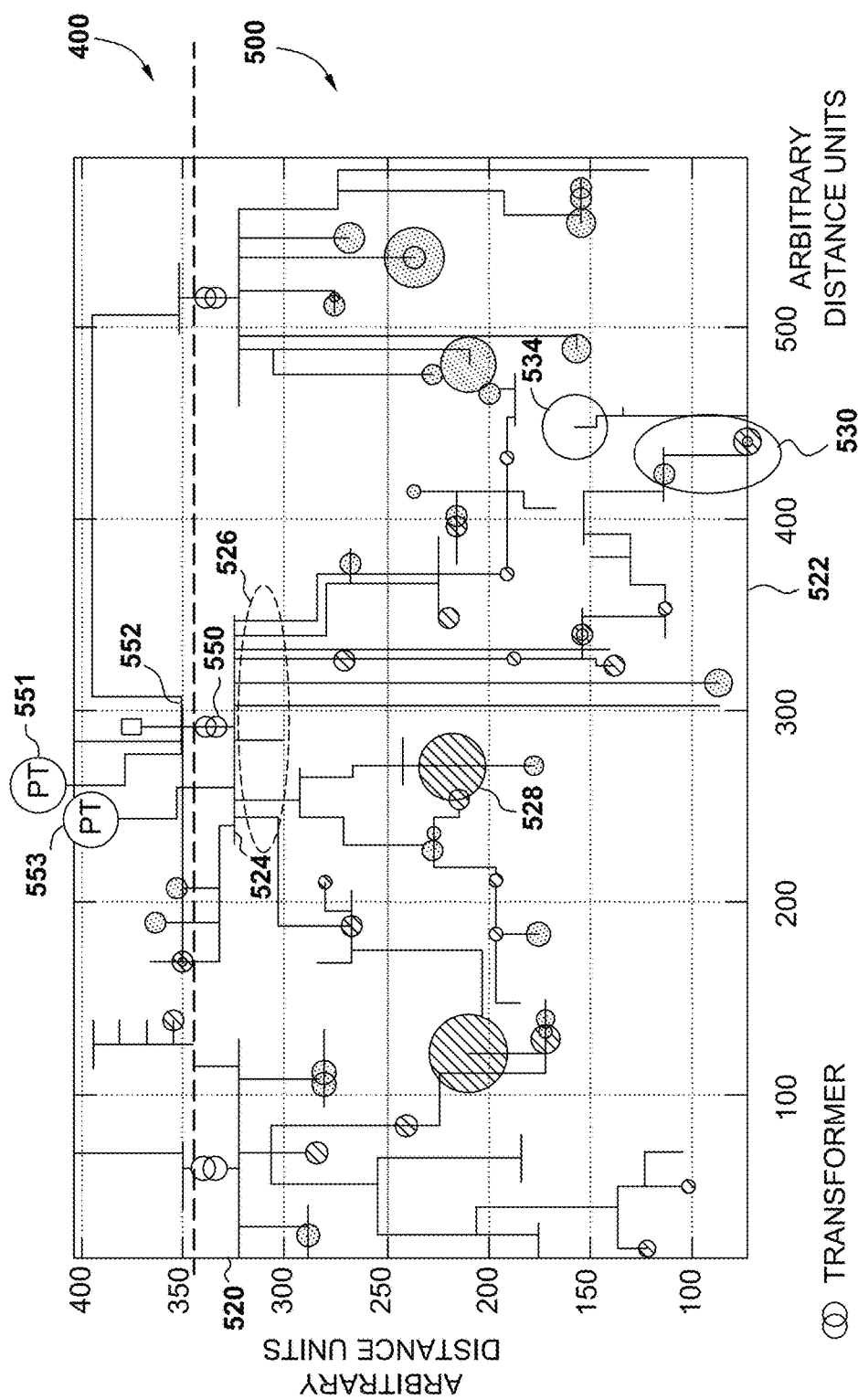
FIG. 4 is an expanded schematic diagram of a portion of the electric power distribution system shown in FIG. 3 and taken at area 4.

FIG. 4 is an expanded schematic diagram of a portion of electric power distribution system 500 taken at area 4 (shown in FIG. 3) that uses the controller 202 (shown in FIG. 2). A y-axis 520 and an x-axis 522 are labeled with distances in arbitrary units. Electric power distribution system 500 includes a low voltage substation bus 524. A plurality of feeder line segments 526 are coupled to a substation bus 524. Many of feeder line segments 526 include a plurality of loads 528 and solar PV arrays 530 that are both configured with various sizes. The larger loads 528 and PV arrays 530 are shown with larger-diameter circles.

Loads 528 vary between 0.1 kilowatts (kW) and 100 kW. Solar PV arrays 530 vary between 3 kW and 100 kW. Alternatively, loads 528 and solar PV arrays 530 have any mix of ratings that enables operation of electric power distribution system 500 as described herein. Electric power distribution system 500 may also include voltage regulators, capacitor banks, distributed generation in the form of diesel generators, and other devices (neither shown) typically used with distribution systems.

Electric power distribution system 500 further includes at least one substation distribution transformer 550 coupled to a medium voltage substation bus 552, e.g., without limitation, 20 kV, and the low voltage substation feeder bus 524. In the exemplary embodiment, transformer 550 is rated for 630 kilo-Volt-Amperes (kVA). Alternatively, transformer 550 has any rating that enables operation of electric power distribution system 500 as described herein. Also, in the exemplary embodiment, transformer 550 is an OLTC transformer with a tap changer device (not shown in FIG. 4, and described further below). A potential transformer (PT) 551 is coupled to medium voltage substation bus 552 proximate transformer 550 to measure voltage on bus 552 and transmit signals representative of the voltage on bus 552 to the controller 202 from the SCADA system 200. Similarly, a PT 553 is coupled to low voltage substation feeder bus 524 proximate transformer 550 to measure voltage on bus 524 and transmit signals representative of the voltage on bus 524 to the controller 202 from the SCADA system 200. In at least some embodiments, a PT is used to measure voltage proximate the tap changer. As such, for those embodiments, and because more than one voltage measurement is typically not needed, only one of PT 551 and PT 553 may be needed.

Figure 5:
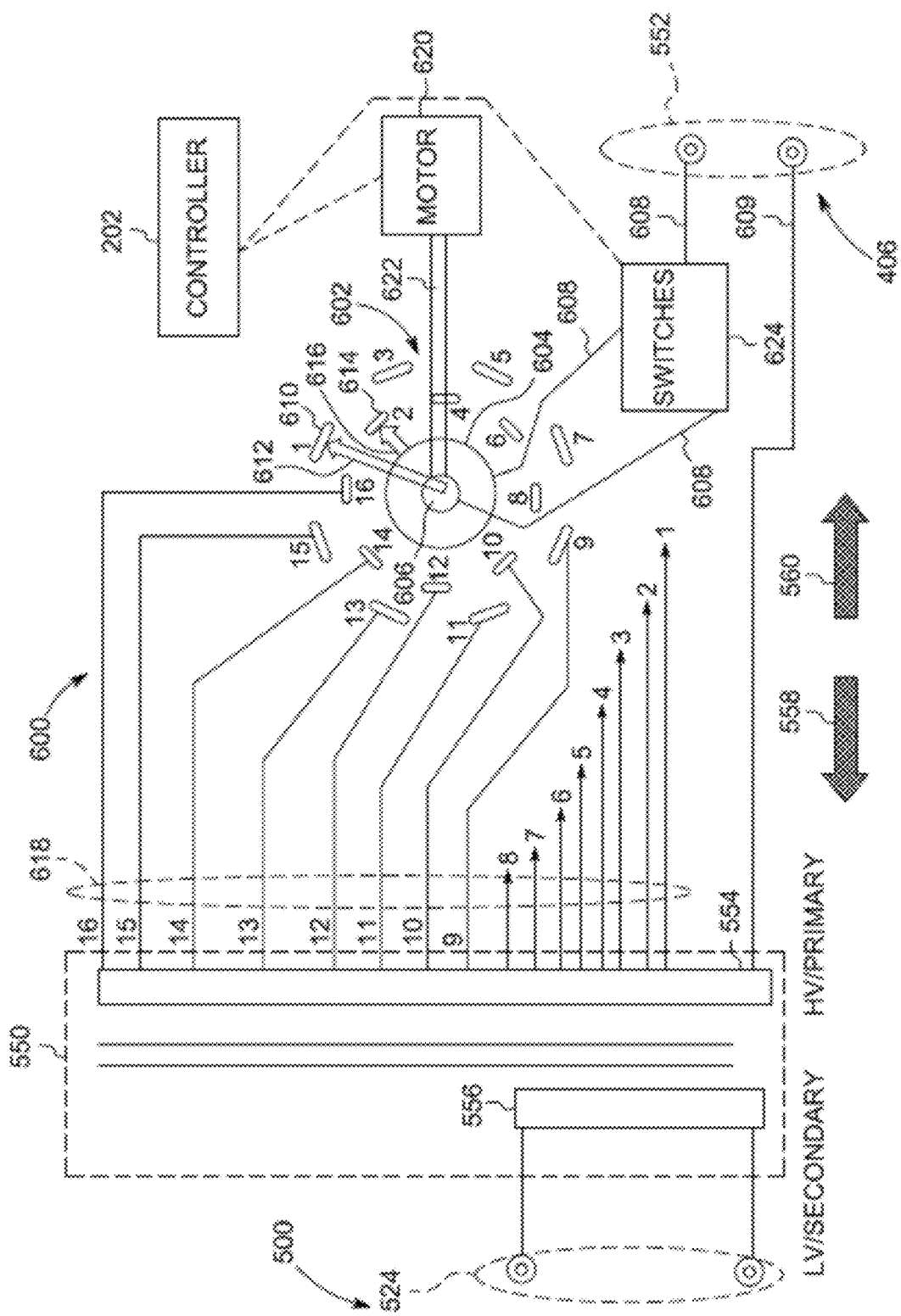
FIG. 5 is a schematic diagram of an exemplary tap changer device that may be used with the electrical network shown in FIG. 3.

FIG. 5 is a schematic diagram of an exemplary on-load tap changer 600 that may be used with electric power distribution system 500 (shown in FIG. 3) and the controller 202 (shown in FIG. 2). In the exemplary embodiment, tap changer 600 is a rotary tap selector in-tank type with a make-before-break contactor configuration. Alternatively, tap changer 600 is any type of tap changer that enables operation of electric power distribution system 500 as described herein. OLTC substation distribution transformer 550 includes a at least one of medium voltage, i.e., primary windings 554 coupled to medium voltage substation bus 552 through tap changer 600. OLTC substation distribution transformer 550 also includes at least one of low voltage, i.e., secondary windings 556 coupled to the low voltage substation feeder bus 524. In the exemplary embodiment, tap changer 600 is physically coupled to primary winding 554. Alternatively, tap changer 600 is physically coupled to at least one of the secondary windings 556.

Electric power may be transmitted in both directions through transformer 550. Specifically, electric power is transmitted from primary windings 554 to secondary windings 556 when power drawn by loads 528 (shown in FIG. 4) is greater than power generation of the sum of operating DG downstream of transformer 550, e.g., solar PV arrays 530 (shown in FIG. 4), power plant 508, solar farm 510, and wind farm 512 (all three shown in FIG. 3), and any diesel generators and micro-turbines (neither shown). Under such conditions, electric power flows from primary windings 554 to secondary windings 556, i.e., from high voltage transmission grid 406 into electric power distribution system 500 as shown with forward arrow 558 and may be referred to as forward power flow or positive power flow. In contrast, if the DG downstream of transformer 550 is generating more power than is consumed downstream of transformer 550 by loads 528, electric power transmission is reversed and electric power flows from secondary windings 556 to primary windings 554, i.e., from electric power distribution system 500 into high voltage transmission grid 406 as shown with reverse arrow 560. This situation may be referred to as reverse power flow or negative power flow.

Tap changer 600 includes a rotary tap selector 602 that includes a first or outer contact portion 604 and a second, or inner contact portion 606, both coupled to medium voltage substation bus 552 through a plurality of conduits 608. Windings 554 are coupled to medium voltage substation bus 552 through a conduit 609. Rotary tap selector 602 includes a plurality of radially outer notches 610 and a first notch selector arm 612 configured to couple with radially outer notches 610. Radially outer notches 610 are configured with odd numerals 1 through 15 corresponding to a plurality of odd numbered OLTC transformer taps 1 through 15 that are coupled to portions of primary windings 554 in incremental portions of windings 554. Rotary tap selector 602 also includes a plurality of radially inner notches 614 and a second notch selector arm 616 configured to couple with radially inner notches 614. Radially inner notches 614 are configured with even numerals 2 through 16 corresponding to a plurality of even numbered OLTC transformer taps 2 through 16 that are coupled to portions of primary windings 554 in incremental portions of windings 554. Odd numbered OLTC transformer taps 1 through 15 and even numbered OLTC transformer taps 2 through 16 define plurality of OLTC transformer taps 618.

Selection of taps 1 through 16 of plurality of OLTC transformer taps 618 regulates an inductive coupling between primary windings 554 and secondary windings 556 by selecting a tap 1 through 16 that provides a predetermined ratio of the number of primary windings 554 to the number of secondary windings 556. Such windings' ratio facilitates a predetermined primary-to-secondary voltage ratio. In the example shown in FIG. 5, the turns ratio increases with increasing the tap number from 1 through 16. The relationship of the number of turns and the voltages is shown as:

$$\frac{V_{IN}}{V_{OUT}} = \frac{T_1}{T_2} \qquad \text{Equation (1)}$$

where $V_{IN}$ represents the inlet voltage, i.e., high voltage on primary windings 554, $V_{OUT}$ represents the outlet voltage, i.e., low voltage on secondary windings 556, $T_1$ represents the number of winding turns associated with primary windings 554, and $T_2$ represents the number of winding turns associated with secondary windings 556.

Tap changer 600 also includes a motor 620 coupled to a tap selection arm 622 that is configured to selectively move each of first notch selector arm 612 and second notch selector arm 616 to a predetermined odd notch 610 and even notch 614, respectively. Tap changer 600 further includes at least one switch 624, e.g., without limitation, a diverter switch, that operate in conjunction with motor 620 to select which of the 16 taps is in service. Tap changer 600 also includes additional equipment, e.g., and without limitation, transition/limiting resistors. Controller 202 is coupled to motor 620 and switches 624 to operate tap changer 600 as described further below.

In operation, one of 1 through 16 of plurality of OLTC transformer taps 618 is selected to provide a first predetermined ratio of primary windings 554 to secondary windings 556. First notch selector arm 612 is positioned to one of radially outer notches 610 oddly numbered 1 through 15 and second notch selector arm 616 is positioned to one of radially inner notches 614 evenly numbered 2 through 16. However, switches 624 select only one of first notch selector arm 612 and second notch selector arm 616 at any one time. Therefore, commands from the controller 202 selectively reposition one of first notch selector arm 612 and second notch selector arm 616 through operation of motor 620 and tap selection arm 622, i.e., the arm 612 or 616 that is not currently associated with the in-service tap. Only numerically adjacent taps can be selected for the next move, e.g., first notch selector arm 612 can shift from notch 1 to notch 3, but not from notch 1 to notch 5 or from notch 1 to notch 15. Once the desired tap notch is selected, the controller 202 operates switches 624 to select the previously unselected notch selector arm 612 or 616 in the new tap position and then de-select the previously selected arm 612 and 616 in a make-before-break manner, thereby establishing a second predetermined ratio of primary windings 554 to secondary windings 556.

Figure 6:
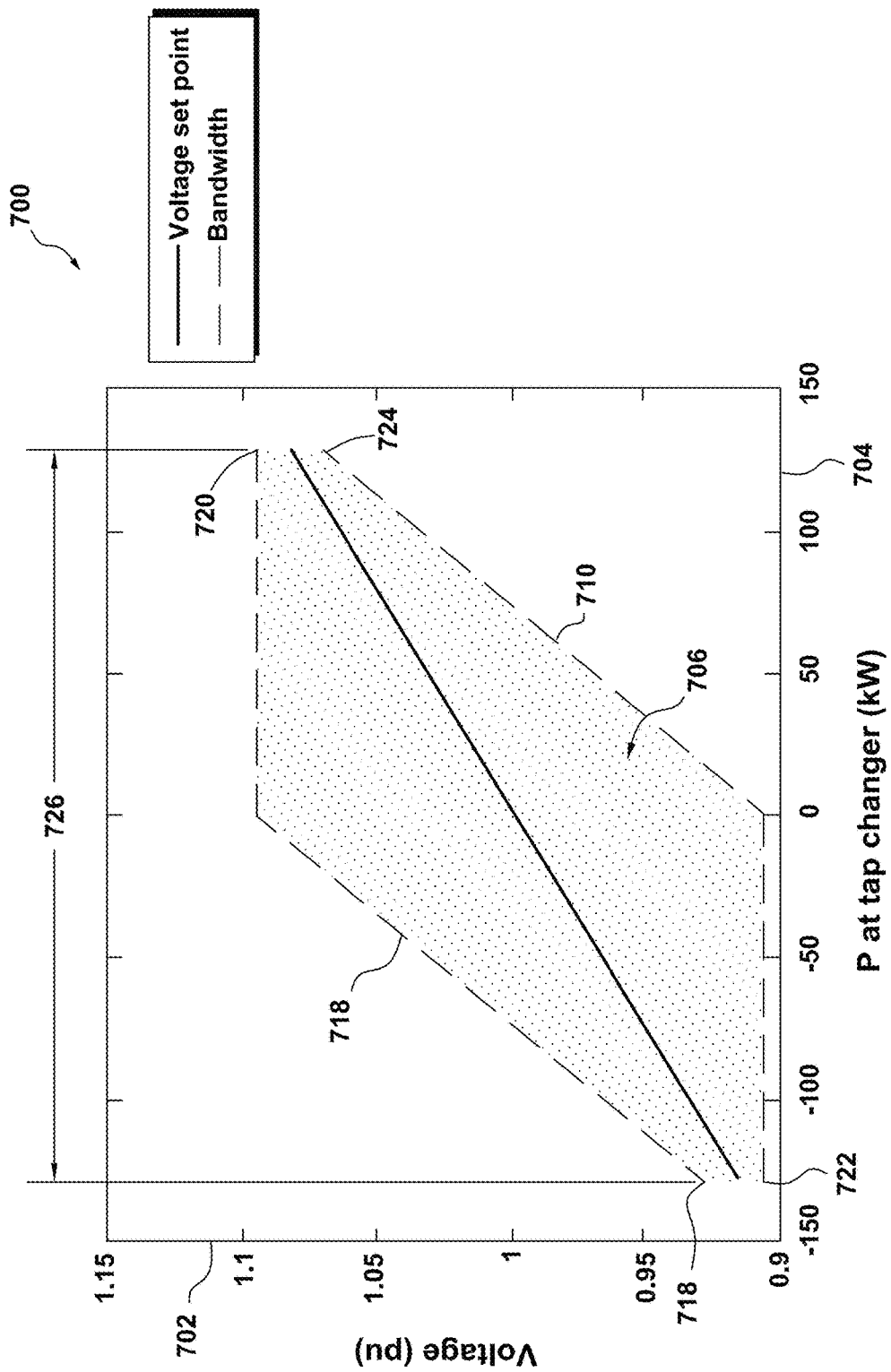
FIG. 6 is a graphical representation of an exemplary control scheme for the tap changer device shown in FIG. 5.

FIG. 6 is a graphical representation of an exemplary control scheme 700 implemented on controller 202 for tap changer 600 (shown in FIG. 5). Control scheme 700 includes a y-axis 702 that represents a voltage (V) for a voltage measured proximate transformer 550 (shown in FIGS. 4 and 5) through PTs 551 or 553 (both shown in FIG. 4) and a set-point voltage for controller 202 (shown in FIG. 2) and tap changer 600 to control to. Control scheme 700 also includes an x-axis 704 that represents electric power transmitted through transformer 550. In some embodiments, the x-axis may also represent electric current transmitted through transformer 550. Y-axis 702 is labeled using the "per-unit" system. X-axis 704 is labeled using the units "kW".

The controller 202 is configured to determine a permissible voltage range or bandwidth around a voltage set-point for a voltage at the tap changer as a function of power flow or current measured at the OLTC transformer 550. In an alternative embodiment the permissible voltage range or bandwidth around a voltage set-point for a voltage at the tap changer as a function of power flow or current measured at the OLTC transformer 550 may be stored on memory device 102 included in controller 202. The measured power flow or current at the OLTC transformer represent an indication for the present network state. Regulation actions are taken when the measured voltage at the tap changer falls out of the bandwidth which is variable dependent on present electrical network conditions.

The bandwidth 706 around the voltage set-point of the tap changer controller 202 needs to be defined in such a way that the voltage in the entire network is in compliance with the permissible voltage limits. In some embodiments, the permissible voltage limits are governed by regulatory standards. For example, in the per unit system, according to some embodiments, the nominal network voltage is 1 pu and a particular regulatory standard may prescribe that the permissible network voltage may be between −10% to +10% of the nominal network voltage. In this example, the permissible voltage for the network voltage including the voltage at the most critical network bus is between 0.9 pu and 1.1 pu, where the former value corresponds to the lower voltage limit and 1.1 pu corresponds to the upper voltage limit as set by the regulatory standard. While an exemplary regulatory standard has been utilized to define the limits of the permissible voltage limits of the network voltage, any known standard may be used to define these limits.

The bandwidth 706 as shown in FIG. 6, includes an upper bandwidth limit 708 and a lower bandwidth limit 710. It describes a region 706 between the upper bandwidth limit 708 and the lower bandwidth limit 710, which is considered the permissible range for a voltage at the tap changer. The computation of the upper bandwidth limit 708 and the lower bandwidth limit 710 for a particular electrical network (such as the network 300 shown in FIG. 3) is based on the applicable voltage limits set by regulatory standards as well as a determination of a plurality of electrical network characteristics. The plurality of electrical network characteristics may be defined by the electrical network's worst case voltage rise and the electrical network's worst case voltage drop for each possible measured current or power flow value at the tap changer (x-axis in FIG. 6). In some embodiments, the measured current or power flow value at the tap changer may give an indication to the prevailing network state. However, one measured current or power flow value at the tap changer may not only be representative of one, but several different network states, which each results in a different network voltage profile. Therefore, the corresponding worst case voltage drop and worst case rise up to the most critical network bus for each measured current or power flow value at the tap changer needs to be found. Thus, if the permissible voltage range at the tap changer is computed based on the worst case voltage drop and worst case voltage rise in such a way that the voltage at the critical network bus is still in compliance with the limits set by regulatory standards even in these two worst case situations, then all possible other network states will also be in compliance with the said standards.

In some embodiments, the maximum possible voltage rise is dependent on factors that include, without limitation, the number of consumers and DGs connected to feeder line segments 526, the consumers' minimum electric power consumption, the maximum power generated by generation units on the feeder line segments 526, a distance between the loads and the generation units connected to the feeder line segments 526 and the tap changer 600, and an impedance associated with the feeder line segments 526. Similarly, the maximum possible voltage drop is dependent on factors that include, without limitation, the number of consumers and DGs connected to feeder line segments 526, the consumers' maximum electric power consumption, the DGs' minimum power production, a distance between the DGs and consumers connected to the feeder line segments 526 and the tap changer 600, and an impedance associated with the feeder line segments 526.

The electrical network characteristics, such as a network's worst case voltage drop and worst case voltage rise, may be determined based on a plurality of electrical values. These electrical values may include, but are not limited to, voltage, current and power at the tap changer for each possible network state, as well as voltage, current and power at the most critical network bus for each possible network state. The critical bus here refers to a bus in the system, where critical voltage violations occur. According to one embodiment, these electrical values may be determined by measurements. The measurements may be carried out over a period of time proximate to the OLTC transformer and the most critical network bus typically proximate to a feeder end 534 (FIG. 4). In some embodiments these electrical values may be determined based on simulations of the electrical network. Further, in some embodiments, these electrical values may be calculated based on some assumptions for electric network parameters that may include, without limitation, line impedances, line lengths, generation and load power rating, and distances of generation units and loads to the tap changer.

In some embodiments, to determine the worst case voltage rise ($\Delta V_{max}$) for each possible current or power flow value at the tap changer, the maximum difference between the computed voltage at the most critical network bus ($V_{critBus}$) and the voltage at the tap changer ($V_{OLTC}$) is utilized. Thus, the worst case voltage rise ($\Delta V_{max}$) from the tap changer up to the most critical network bus is given by:

$$\Delta V_{max} = \max(V_{critBus} - V_{OLTC}) \qquad \text{Equation (2)}$$

In some embodiments, this worst case voltage rise ($\Delta V_{max}$) is computed for each possible current or power flow value at the tap changer, where the current and power flow at the tap changer give an indication to the presently prevailing network state.

According to one embodiment, the maximum permissible voltage at the tap changer ($V_{OLTC(max)}$) for each network condition is defined by the worst case voltage rise. Since the maximum permissible voltage at the tap changer ($V_{OLTC(max)}$) limits the permissible voltage range or bandwidth 706 at the tap changer, the maximum permissible voltage at the tap changer ($V_{OLTC(max)}$) corresponds to the upper bandwidth limit 708. In order to comply with the applicable regulatory standards, the maximum voltage at the tap changer ($V_{OLTC(max)}$) plus the worst case voltage rise ($\Delta V_{max}$) up to the most critical network bus may not exceed the upper voltage limit ($V_{limit(h)}$) set by the standards. Therefore, in one embodiment, the upper bandwidth limit 708 or the maximum permissible voltage at the tap changer ($V_{OLTC(max)}$) is determined using equation 3:

$$V_{OLTC(max)} \leq V_{limit(h)} - \Delta V_{max} \qquad \text{Equation (3)}$$

In some embodiments, this maximum permissible voltage at the tap changer ($V_{OLTC(max)}$) is computed for each possible network state, where each possible network state may be indicated by the power flow or current at the tap changer. Thus, the upper bandwidth limit 708 is determined as a function of network state.

The upper bandwidth limit 708 corresponds to the maximum permissible voltage at the tap changer ($V_{OLTC(max)}$) for each possible network state indicated by the power flow value over the tap changer (x-axis in FIG. 6). Therefore, during operation, if for a certain measured power flow or current value at the OLTC transformer, the worst case voltage rise applies, it will be ensured that—even in this worst case—the voltage at the most critical network bus still remains within the permissible voltage limits set by regulatory standards.

In some embodiments, when defining the upper bandwidth limit 708, a safety margin ($V_{safety}$) that a user may enter through a user input interface, such as the user input interface 110, is reduced from the upper voltage limit ($V_{limit(h)}$) set by regulatory standards. For example, the upper bandwidth limit 708 or maximum permissible voltage at the tap changer ($V_{OLTC(max)}$) given by equation 3 may be reduced by $V_{safety}$:

$$V_{OLTC(max)} \leq V_{limit(h)} - \Delta V_{max} - V_{safety} \qquad \text{Equation (4)}$$

In some embodiments, the power flow value at points 718 and 722 represents the maximum possible reverse power flow value. For an exploitation of the network's maximum hosting capacity for DGs, the difference between point 718 and point 722 represents the minimum permissible bandwidth. In this case the difference between point 718 and 722 must be greater than a voltage change caused by a single tap change of the tap changer 600 in order to allow for stable operation.

Similarly, to determine the worst case voltage drop ($\Delta V_{min}$) for each possible current or power flow value at the tap changer, the minimum difference between the computed voltage at the most critical network bus ($V_{critBus}$) and the voltage at the tap changer ($V_{OLTC}$) is utilized. Thus, the worst case voltage drop ($\Delta V_{min}$) from the tap changer up to the most critical network bus is given by:

$$\Delta V_{min} = \min(V_{critBus} - V_{OLTC}) \qquad \text{Equation (5)}$$

In some embodiments, this worst case voltage drop ($\Delta V_{min}$) is computed for each possible current or power flow value at the tap changer, where the current and power flow at the tap changer give an indication to the presently prevailing network state.

According to one embodiment, the minimum permissible voltage at the tap changer ($V_{OLTC(min)}$) for each network condition is defined by the worst case voltage drop. Since the minimum permissible voltage at the tap changer ($V_{OLTC(min)}$) limits the permissible voltage range or bandwidth 706 at the tap changer, the minimum permissible voltage at the tap changer ($V_{OLTC(min)}$) corresponds to the lower bandwidth limit 710. In order to comply with the applicable regulatory standards, the minimum voltage at the tap changer ($V_{OLTC(min)}$) minus the worst case voltage drop ($\Delta V_{min}$) up to the most critical network bus may not fall below the lower voltage limit ($V_{limit(l)}$) set by the standards. Therefore, in one embodiment, the lower bandwidth limit 710 or the minimum permissible voltage at the tap changer ($V_{OLTC(min)}$) is determined using equation 6:

$$V_{OLTC(min)} \geq V_{limit(l)} - \Delta V_{min} \qquad \text{Equation (6)}$$

In some embodiments, this minimum permissible voltage at the tap changer ($V_{OLTC(min)}$) is computed for each possible network state, where each possible network state may be indicated by the power flow or current at the tap changer. Thus, the lower bandwidth limit 710 is determined as a function of network state.

Thus, the lower bandwidth limit 710 corresponds to the minimum permissible voltage at the tap changer for each possible network state indicated by the power flow value at the tap changer (x-axis in FIG. 6). Therefore, if for a certain measured power flow or current value at the tap changer, the worst case voltage drop applies, it will be ensured that—even in this worst case—the voltage at the most critical network bus still remains within the permissible voltage limits set by regulatory standards.

In some embodiments, when defining the lower bandwidth limit 710, a safety margin ($V_{safety}$) that a user may enter through a user input interface, such as the user input interface 110, is added to the lower voltage limit ($V_{limit(l)}$) set by regulatory standards. For example, the lower bandwidth limit 710 or minimum permissible voltage at the tap changer ($V_{OLTC(min)}$) given by equation 6 may be adjusted by adding $V_{safety}$:

$$V_{OLTC(min)} \geq V_{limit(l)} - \Delta V_{max} + V_{safety} \qquad \text{Equation (7)}$$

In some embodiments, the power flow value at points 720 and 724 represents the maximum possible forward power flow value at the tap changer. For an exploitation of the network's maximum hosting capacity for loads, such as, without limitation, electric vehicles, the difference between point 720 and point 724 represents the minimum permissible bandwidth. In this case the difference between point 720 and 724 must be greater than a voltage change caused by a single tap change of the tap changer 600 in order to allow for stable operation.

The methods for deriving the upper bandwidth limit 708 and the lower bandwidth limit 710 are for example only. Alternatively any methods deriving a network state dependent bandwidth or a bandwidth that is a function of current or power flow over the tap changer that enable operation of transformer 550 and tap changer 600 (shown in FIG. 5) as described herein are used.

In some embodiments, a voltage set-point that lies between the upper and lower bandwidth limit may be derived. The voltage set-point at the tap changer 600, according to one embodiment, may be constant for all possible power or current flow values at the tap changer. In one embodiment, the constant voltage set-point may be provided by the user through the user input interface 110. According to certain examples, the voltage set-point for each possible current or power flow value at the tap changer may be determined based on the maximum permissible voltage at the tap changer ($V_{OLTC(max)}$) i.e., the upper bandwidth limit 708, for each possible network state and the minimum permissible voltage at the tap changer ($V_{OLTC(min)}$), i.e., lower bandwidth limit 710, for each possible network state. For example, in case the voltage set-point should lie halfway between the upper and lower bandwidth limit, the voltage set-point ($V_{set}$) for each possible network state may be defined according to Equation 8:

$$V_{set} = V_{OLTC(min)} + \frac{V_{OLTC(max)} - V_{OLTC(min)}}{2} \qquad \text{Equation (8)}$$

During operation, as the measured power flow at the OLTC transformer varies within region 726, a permissible voltage range for the voltage at the tap changer 600 is determined according to control scheme 700. In operation, when the voltage measured at tap changer 600 is greater than the voltage set-point and also falls out of bandwidth 706, a tap lowering command is initiated by controller 202. Further, when the voltage measured at the tap changer 600 is less than the voltage set-point and also falls out of bandwidth 706, a tap raising command is initiated by controller 202. The tap change command causes the tap changer 600 to select the appropriate tap 1 through 16 of plurality of taps 618.

Further, the current or power flow dependent bandwidth around a voltage set point curve may be loaded into memory device 102 as predetermined control parameters for transformer 550.

Furthermore, the number of tap changes required to maintain the voltage at the tap changer 600 in the permissible voltage limits set by regulatory standards is reduced since the bandwidth depends on current or power flow characteristics and reflect a criticality of the network state. The variable nature of the bandwidth also caters to the need of increasing hosting capacity of the electrical network.

Exemplary embodiments of electrical power systems for transmitting electric power to customer loads downstream of a distribution substation transformer, and methods of operating such systems and devices are not limited to the specific embodiments described herein, but rather, components of systems and/or steps of the methods may be utilized independently and separately from other components and/or steps described herein. For example, the methods may also be used in combination with other systems requiring electric power transmission and the associated methods, and are not limited to practice with only the transmission and distribution systems and methods as described herein. Rather, the exemplary embodiment can be implemented and utilized in connection with many other transmission applications that are currently configured to transmit and receive electric power, e.g., and without limitation, distribution systems in remote areas and industrial facilities.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric power system comprising:
an on-load tap changing (OLTC) transformer comprising at least one primary winding and at least one secondary winding, wherein a portion of the at least one primary winding and the at least one secondary winding are inductively coupled to each other;
at least one on-load tap changer coupled to the at least one primary winding or the at least one secondary winding, wherein the at least one on-load tap changer is selectively configured to regulate the portion of the at least one primary winding or the at least one secondary winding that are inductively coupled to each other;
at least one controller coupled to the at least one on-load tap changer, wherein the at least one controller is configured to determine a permissible voltage range defined by a bandwidth around a voltage set-point at the at least one on-load tap changer, wherein the bandwidth is variable and is a function of one or more electrical network states;
wherein the one or more electrical network states are indicated by current or power flow measurements at the at least one tap changer; and
wherein the at least one controller is further configured to determine a maximum possible voltage rise and a maximum possible voltage drop in the electrical network for each of the current or power flow measurements at the tap changer based on a plurality of factors, and wherein the plurality of factors comprise line resistances, line lengths, power ratings of at least one load, power ratings of at least one power source, distances between the tap changer and at least one load, and distances between the tap changer and at least one power source.

2. The electric power system in accordance with claim 1, wherein the controller is further configured to:
   generate an upper bandwidth limit of the permissible voltage range that is a function of one or more electrical network states; and
   generate a lower bandwidth limit of the permissible voltage range that is a function of one or more electrical network states.

3. The electric power system in accordance with claim 1, wherein the upper and lower bandwidth limits of the permissible voltage range that are a function of one or more electrical network states are based on a:
   maximum possible voltage rise for each of the current or power flow measurements at the at least one tap changer; and
   minimum possible voltage drop for each of the current or power flow measurements at the at least one tap changer.

4. The electric power system in accordance with claim 1, wherein a voltage set-point for the OLTC transformer is variable dependent on the one or more electrical network states.

5. The electric power system in accordance with claim 1 further comprising at least one memory device coupled to the at least one controller, wherein the at least one memory device is configured to store the bandwidth at the tap changer as a function of the one or more electrical network states.

6. The electric power system in accordance with claim 1, wherein a voltage set-point for the OLTC transformer is constant.

7. A method of regulating a voltage at an on-load tap changer, the on-load tap changer being coupled to at least one primary winding or at least one secondary winding of an OLTC transformer, the on-load tap changer being configured to regulate an inductive coupling between the at least one primary winding and the at least one secondary winding, wherein the on-load tap changer is communicably coupled to a controller, the method comprising:
   determining a bandwidth around a voltage set-point at the on-load tap changer that is variable and is a function of one or more electrical network states;
   measuring the voltage at the on-load tap changer in the electrical network;
   generating a command for at least one tap change when the measured voltage falls out of bandwidth that is a function of one or more electrical network states defined for the electrical network such that a measured voltage after the at least one tap change is within the bandwidth, wherein the one or more electrical network states are indicated by current or power flow measurements at the at least one tap changer; and
   determining a maximum possible voltage rise and a maximum possible voltage drop in the electrical network for each of the current or power flow measurements at the tap changer based on a plurality of factors, and wherein the plurality of factors comprise line resistances, line lengths, power ratings of at least one load, power ratings of at least one power source, distances between the tap changer and at least one load, and distances between the tap changer and at least one power source.

8. The method in accordance with claim 7, further comprising:
   generating an upper bandwidth limit of the permissible voltage range that is a function of one or more electrical network states; and
   generating a lower bandwidth limit of the permissible voltage range that is a function of one or more electrical network states.

9. The method in accordance with claim 8, wherein generating the upper bandwidth limit and the lower bandwidth limit of the permissible range further comprises:
   determining the maximum possible voltage rise for each of the current or power flow measurements at the at least one tap changer; and
   determining the minimum possible voltage drop for each of the current or power flow measurements at the at least one tap changer.

10. The method in accordance with claim 8, wherein the voltage set-point for the OLTC transformer is variable dependent on the one or more electrical network states.

11. The method in accordance with claim 7, further comprising storing the bandwidth for the electrical network as a function of the one or more electrical network states.

12. The method in accordance with claim 7, wherein the voltage set-point for the OLTC transformer is constant.

* * * * *